(12) United States Patent
Itabashi et al.

(10) Patent No.: US 10,870,582 B2
(45) Date of Patent: Dec. 22, 2020

(54) METHOD OF PRODUCING BETA ZEOLITE

(71) Applicants: MITSUI MINING & SMELTING CO., LTD., Tokyo (JP); The University of Tokyo, Tokyo (JP)

(72) Inventors: Keiji Itabashi, Tokyo (JP); Shanmugam Palani Elangovan, Tokyo (JP); Tatsuya Okubo, Tokyo (JP)

(73) Assignees: MITSUI MINING & SMELTING CO., LTD., Tokyo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 16/310,640

(22) PCT Filed: Jun. 13, 2017

(86) PCT No.: PCT/JP2017/021860
§ 371 (c)(1),
(2) Date: Dec. 17, 2018

(87) PCT Pub. No.: WO2017/217424
PCT Pub. Date: Dec. 21, 2017

(65) Prior Publication Data
US 2019/0177173 A1 Jun. 13, 2019

(30) Foreign Application Priority Data
Jun. 17, 2016 (JP) .................................. 2016-121288

(51) Int. Cl.
*C01B 39/46* (2006.01)
*B01J 29/70* (2006.01)
(Continued)

(52) U.S. Cl.
CPC .............. *C01B 39/46* (2013.01); *B01J 20/18* (2013.01); *B01J 20/28004* (2013.01);
(Continued)

(58) Field of Classification Search
CPC ....... C01B 39/46; B01J 29/7007; B01J 20/18; B01J 20/28004; B01J 2229/37; C01P 2004/61; C01P 2004/62
See application file for complete search history.

(56) References Cited

U.S. PATENT DOCUMENTS 1,047,692 A * 12/1912 Para .......................... B60L 5/10
191/80
3,308,069 A 3/1967 Kerr et al.
(Continued)

FOREIGN PATENT DOCUMENTS

CN 101249968 A 8/2008
CN 102502684 B 5/2013
(Continued)

OTHER PUBLICATIONS

Extended European Search Report dated Jul. 12, 2019, issued in the EP Patent Application No. EP17813320.3.
(Continued)

*Primary Examiner* — David M Brunsman
(74) *Attorney, Agent, or Firm* — Rankin, Hill & Clark LLP

(57) ABSTRACT

Provided is a production method with which it is possible to produce beta zeolite at high purity by suppressing the generation of impurities by a seed crystal addition method that can reduce the environmental burden as much as possible, without using an organic structure-directing agent. This method for producing beta zeolite having a step that mixes and heats an organic-compound-free reaction mixture comprising a silica source, alumina source, alkali source, and water with beta zeolite seed crystals, wherein (I) beta zeolite synthesized without using an organic structure-directing agent and having 90% or more by volume of particles 10 μm or less in diameter in the particle size distribution by a laser diffraction scattering-type particle size
(Continued)

EXAMPLE 1 distribution measurement method is used, (III) acid-treated zeolite in which the $SiO_2/Al_2O_3$ ratio is 150 or less is prepared by (II) contact treatment with an acidic aqueous solution, and the acid-treated zeolite is used as the beta zeolite seed crystals.

9 Claims, 12 Drawing Sheets

(51) Int. Cl.
*B01J 20/18* (2006.01)
*B01J 20/28* (2006.01)
*B01J 35/02* (2006.01)

(52) U.S. Cl.
CPC ......... *B01J 29/7007* (2013.01); *B01J 35/023* (2013.01); *C01P 2002/72* (2013.01); *C01P 2004/61* (2013.01); *C01P 2004/62* (2013.01)

(56) References Cited

U.S. PATENT DOCUMENTS

| | | | |
|---|---|---|---|
| 4,923,690 A | 5/1990 | Valyocsik et al. | |
| 8,282,908 B2 * | 10/2012 | Itabashi | C01B 39/46 423/709 |
| 8,865,121 B2 * | 10/2014 | Xiao | B01J 29/7007 423/709 |
| 9,656,238 B2 * | 5/2017 | Ogura | B01D 53/02 |
| 9,670,068 B2 * | 6/2017 | Itabashi | C01B 39/026 |
| 9,688,541 B2 * | 6/2017 | Itabashi | C01B 39/46 |
| 10,501,328 B2 * | 12/2019 | Itabashi | C01B 39/46 |
| 2012/0190534 A1 | 7/2012 | Itabashi et al. | |
| 2013/0156690 A1 * | 6/2013 | Itabashi | C01B 39/02 423/709 |
| 2014/0157987 A1 | 6/2014 | Ogura et al. | |
| 2018/0022612 A1 | 1/2018 | Itabashi et al. | |

FOREIGN PATENT DOCUMENTS

| | | |
|---|---|---|
| EP | 2457872 A1 | 5/2012 |
| EP | 2589573 A1 | 5/2013 |
| JP | H09175818 | 7/1997 |
| JP | 2012045483 A2 | 3/2012 |
| JP | 2012136408 A2 | 7/2012 |
| JP | 2012162446 A2 | 8/2012 |
| WO | 2011013560 A1 | 2/2011 |
| WO | 2016129555 A1 | 8/2016 |

OTHER PUBLICATIONS

R. Otomo et al., "Effect of the Al content in the precursor on the crystallization of OSDA-free Beta zeolite," Microporous and mesoporous Materials, Dec. 2, 2015, p. 155-162, vol. 224, Elsevier Inc., The Netherlands; Cited in EESR.

International Search Report (ISR) dated Sep. 5, 2107 filed in PCT/JP2017/021860.

CH. Baerlocher et al., Atlas of Zeolite Framework Types, Published on behalf of the Commission of the International Zeolite Association, 2007, pp. 72-73; Cited in Specification.

M. M. J. Treacy et al., Collection of Simulated XRD Powder Patterns for Zeolites, Published on behalf of the Commission of the International Zeolite Association, 2007, pp. 82-83 and p. 480; Cited in Specification.

Ramesh B. Borade et al., Preparation of aluminum-rich Beta zeolite, Microporous Materials, vol. 5, pp. 289-297, 1996; Cited in Specification.

Bin Xie et al., Organotemplate-Free and Fast Route for Synthesizing Beta Zeolite, Chemistry of Materials, vol. 20, No. 14, pp. 4533-4535, 2008; Cited in Specification.

Yoshihiro Kamimura, et al., Critical factors in the seed-assisted synthesis of zeolite beta and "green beta" from OSDA-free Na+-aluminosific.ate gels, Chemistry—An Asian Journal, vol. 5, pp. 2182-2191, 2010; Cited in Specification.

\* cited by examiner

REFERENCE EXAMPLE 2

REFERENCE EXAMPLE 3

XRD DIAGRAM OF CRYSTALS RECOVERED FROM FILTRATE

REFERENCE EXAMPLE 16

EXAMPLE 9

EXAMPLE 17

EXAMPLE 19

METHOD OF PRODUCING BETA ZEOLITE

TECHNICAL FIELD

The present invention relates to a method of producing a beta zeolite.

BACKGROUND ART

A synthetic zeolite is crystalline aluminosilicate and has uniform pores with an angstrom size that are attributed to a crystal structure thereof. Taking advantage of such a feature, the synthetic zeolite is industrially used as a molecular sieving adsorbent that adsorbs only a molecule having a specific size, an adsorption separating agent that adsorbs a molecule having strong affinity, or a catalytic base. A beta zeolite that is one of such zeolites is currently used in quantity as a catalyst in the petrochemical industry or an adsorbent for vehicle exhaust gas treatment throughout the world. The characteristic of the beta zeolite is that the zeolite has pores of a 12-membered ring in a three-dimensional direction, as disclosed in Non-Patent Document 1. The X-ray diffraction diagram showing its structural characteristics is disclosed in Non-Patent Document 2.

Various methods of synthesizing the beta zeolite are proposed. A typical method is a method of using a tetraethylammonium ion as an organic structure-directing agent (hereinafter abbreviated to "OSDA"). Such methods are disclosed in, for instance, Patent Documents 1 to 3 and Non-Patent Document 3 below. These methods enable the production of beta zeolite having a $SiO_2/Al_2O_3$ ratio of 10 to 400. Compounds containing the tetraethylammonium ion are, however, expensive and furthermore, most of the compounds decompose after the beta zeolite crystallization is terminated. As such, it is impossible to recover and reuse the compounds. For this reason, the beta zeolite produced by such a method is expensive. Further, since the tetraethylammonium ion is incorporated into crystals of the beta zeolite, it is necessary to calcine the beta zeolite to remove the tetraethylammonium ion when the beta zeolite is used as an adsorbent or a catalyst. In that case, exhaust gases are responsible for environmental pollution, and further, many chemicals are required for detoxification treatment of a synthetic mother liquid. In this way, the method of synthesizing the beta zeolite using the tetraethylammonium ion is not only an expensive method but also a production method having a great environmental load. As such, there is a need to realize a production method of using no OSDA.

Under such circumstances, a method for synthesizing a beta zeolite using no OSDA has been proposed in Non-Patent Document 4. In this method, the beta zeolite synthesized using tetraethylammonium ions is calcined to remove organic components and the obtained product is used as a seed crystal. The seed crystal is added to a sodium aluminosilicate reaction mixture containing no organic substance, a hydrothermal treatment is performed, and thereby crystallization is performed. However, the tetraethylammonium ions as OSDA are always needed in this method, though the used amount is reduced, because the beta zeolite which is synthesized by using tetraethylammonium ions, followed by firing, is used as a seed crystal. Moreover, the above-mentioned document discloses only one type of seed crystal and only one example in which numerical values are limited with regard to the composition of a sodium aluminosilicate reaction mixture. Therefore, although the composition of the synthesized beta zeolite is not disclosed in the above-mentioned document, it is considered that the composition has only determined values.

On the other hand, Patent Document 4 by the authors of Non-Patent Document 4 discloses a $SiO_2/Al_2O_3$ ratio of the seed crystal and further discloses not a single discrete composition but a narrow range which is remote from the single discrete composition, for the composition of a sodium aluminosilicate reaction mixture. The technique disclosed in Patent Document 4 is, however, basically the same technique as that of Non-Patent Document 4 and the range of the composition of the reaction mixture is so narrow that the $SiO_2/Al_2O_3$ ratio of the beta zeolite is limited only to a restricted range. Zeolites having a wide range of $SiO_2/Al_2O_3$ ratio are desired to meet various demands. Moreover, establishment of conditions allowing synthesis by stirring is desired for industrial mass production. In order to reduce the environmental load as much as possible, a proposal of a new production method of beta zeolite is desired, in which a seed crystal which eliminates the need of firing is used and no OSDA is used.

Thereafter, the present inventors have made extensive research and as described in Patent Document 5 and Non-Patent Document 5, conditions under which the synthesis can be performed in a wider composition range of the reaction mixture were found by the present inventors, and the $SiO_2/Al_2O_3$ ratio of the obtained beta zeolite was also expanded. In addition, Patent Document 5 and Non-patent Document 5 disclose a method of synthesizing a beta zeolite using completely no OSDA, wherein the beta zeolite is synthesized by adding a seed crystal without using an OSDA and further the synthesized beta zeolite is reused as the seed crystal. Since this method is a green process in which no OSDA is intrinsically used and environmental load is ultimately small, this method enables synthesis of a so-called "green beta zeolite".

Patent Document 1: U.S. Pat. No. 3,308,069, Specification
Patent Document 2: U.S. Pat. No. 4,923,690, Specification
Patent Document 3: Japanese Unexamined Patent Application, Publication No. H09-175818
Patent Document 4: CN101249968A
Patent Document 5: Pamphlet of PCT International Publication No. WO2011/013560
Non-Patent Document 1: Ch. Baerlocher, L. B. McCusker, D. H. Olson, Atlas of Zeolite Framework Types, Published on behalf of the Commission of the International Zeolite Association, 2007, pp. 72-73
Non-Patent Document 2: M. M. J. Treacy and J. B. Higgins, Collection of Simulated XRD Powder Patterns for Zeolites, Published on behalf of the Commission of the International Zeolite Association, 2007, pp. 82-83 and p. 480
Non-Patent Document 3: Microporous Materials, Vol. 5, pp. 289-297 (1996)
Non-Patent Document 4: Chemistry of Materials, Vol. 20, No. 14, pp. 4533-4535 (2008)
Non-Patent Document 5: Chemistry—An Asian Journal, Vol. 5, p. 2182-2191 (2010)

DISCLOSURE OF THE INVENTION

Problems to be Solved by the Invention

FIG. 1 shows a synthesis method of a beta zeolite in which an OSDA is used. As shown in FIG. 1, according to conventional methods, a beta zeolite is produced in an order of <1>, <2> and <3>. Additionally, in the method indicated in Patent Document 4 and Non-Patent Document 4, the beta zeolite is produced in an order of <1>, <2>, <3>, <4>, <5>, <6> and <9>. In this method, use of a seed crystal is essential, and for the production of the seed crystal, an OSDA of tetraethylammonium ions is essential. Moreover, it is necessary to remove the tetraethylammonium ions by firing at a high temperature.

Contrary to this method, Patent Document 5 discloses six production methods. In one of the methods, likewise to the afore-mentioned method, the seed crystal is produced in an order of <1>, <2>, <3>, <4>, <5>, <6> and <9>, but the $SiO_2/Al_2O_3$ ratio of the seed crystal and the composition of the reaction mixture are different from those of conventional methods. Therefore, it is possible to produce a beta zeolite having a wide range of $SiO_2/Al_2O_3$ ratio. In the second method, the seed crystal is produced in an order of <1>, <2>, <3>, <4>, <5>, <7>, <6> and <9> and the resulting seed crystal is subjected to aging, followed by statically heating, and thereby the seed crystal having a low $SiO_2/Al_2O_3$ ratio can be effectively used. In the third method, the seed crystal is produced in an order of <1>, <2>, <3>, <4>, <5>, <7>, <8> and <9>.

Further, Patent Document 5 discloses that it is also possible to produce the beta zeolite in an order of <10>, <5>, <6> and <9>; in an order of <10>, <5>, <7>, <6> and <9>; and in an order of <10>, <5>, <7>, <8> and <9>. In these three methods, a beta zeolite obtained without using an OSDA is used as a seed crystal and this seed crystal can be repeatedly used. Thus, these three methods are production methods in which no OSDA is essentially used. These three production methods can be said to be production methods of a beta zeolite by a green process which ultimately has a small environmental load. Namely, these methods enable the first production of the "green beta zeolite".

Patent Document 5 discloses that when the beta zeolite synthesized without using an OSDA is recycled as a seed crystal, the zeolite is added to the reaction mixture without modification. Subsequently, the inventors, however, studied and found that recycling of the obtained zeolite without modification, as disclosed in Patent Document 5, yields a beta zeolite, but impurities such as mordenite are generated as a by-product, depending upon conditions.

Thus, it is an object of the present invention to solve the above-mentioned drawbacks of the prior art and to provide a production method of a beta zeolite using a seed crystal synthesized without using an OSDA, wherein the formation of impurities is suppressed, a beta zeolite with high purity can be produced and environmental load can be reduced as much as possible. Specifically, it is an object of the present invention to clarify the characteristics of a seed crystal capable of suppressing the formation of impurities and producing a beta zeolite with high purity, in a production method of a beta zeolite in an order of <10>, <5>, <6> and <9>, in an order of <10>, <5>, <7>, <6> and <9>, or in an order of <10>, <5>, <7>, <8> and <9>, indicated in FIG. 1 and thereby to provide a production method of a beta zeolite which includes addition of a seed crystal containing no OSDA and which can simultaneously reduce environmental load and production costs.

Means for Solving the Problems

The inventors intensively examined the characteristics of repeatedly usable seed crystals and clarified the characteristics of the beta zeolite which enables the suppression of impurity formation and allows the production of a beta zeolite with high purity in the production methods wherein the beta zeolite is produced in the order of <10>, <5>, <6> and <9>, in the order of <10>, <5>, <7>, <6> and <9> and in the order of <10>, <5>, <7>, <8> and <9> in FIG. 1.

In other words, the present invention relates to a method of producing a beta zeolite: comprising mixing a reaction mixture containing no organic compound and consisting of a silica source, an alumina source, an alkali source and water with a beta zeolite seed crystal and heating the mixture, wherein (I) the beta zeolite seed crystal is one synthesized without using an organic structure-directing agent and comprises particles having a particle size of 10 μm or less in an amount of 90% or more on a volume basis in the particle size distribution as determined by a laser diffraction/scattering particle size distribution measuring method, (II) the seed crystal beta zeolite is subjected to contact treatment with an aqueous acidic solution, and thereby (III) an acid-treated zeolite having a $SiO_2/Al_2O_3$ molar ratio of 150 or less is prepared and this is used as the beta zeolite seed crystal. The provision of the above-mentioned method of producing a beta zeolite solves the problem of the present invention.

Effects of the Invention

The present invention provides a method of producing a beta zeolite by way of addition of a seed crystal synthesized without using an OSDA, wherein formation of impurities is suppressed, a beta zeolite with high purity is produced and environmental load can be reduced as much as possible.

PREFERRED MODE FOR CARRYING OUT THE INVENTION

Below, the present invention is explained based on preferred embodiments thereof. The production method of a beta zeolite according to the present invention comprises the step of mixing a reaction mixture comprising a silica source, an alumina source, an alkali source and water with a seed crystal consisting of a beta zeolite and heating the mixture.

One of the characteristics of the present invention is in the seed crystal. More specifically, the seed crystal of the present invention has the following characteristics:

(I) the beta zeolite seed crystal used is one synthesized without using an organic structure-directing agent and comprises particles having a particle size of 10 μm or less in an amount of 90% or more on a volume basis in the particle size distribution as determined by a laser diffraction/scattering particle size distribution measuring method, (II) the beta zeolite seed crystal is an acid-treated seed crystal obtained by contact treatment with an aqueous acidic solution and (III) the beta zeolite seed crystal has a $SiO_2/Al_2O_3$ molar ratio of 150 or less.

The present inventors infer that growth of crystals of beta zeolite occurs on the surface of a seed crystal in the production method of a beta zeolite using a seed crystal. Therefore, it is inferred that the greater the active surface area of the seed crystal, the more effective the addition of seed crystal. In order to increase the surface area of a crystal, it is effective to decrease particle size of the crystal.

Since the synthetic zeolite is generally synthesized as crystals in a state where single crystals having different sizes are aggregated, it is not easy to obtain a particle size distribution of a single crystal but it is possible to obtain particle size distribution of particles comprising aggregated particles. Given the above, the present inventors have intensively studied the correlation between the particle size distribution of seed crystal of beta zeolite and characteristic properties of obtained beta zeolite and have succeeded in obtaining optimal particle size distribution of the seed crystal which enables the production of beta zeolite with high purity.

Figure 1:
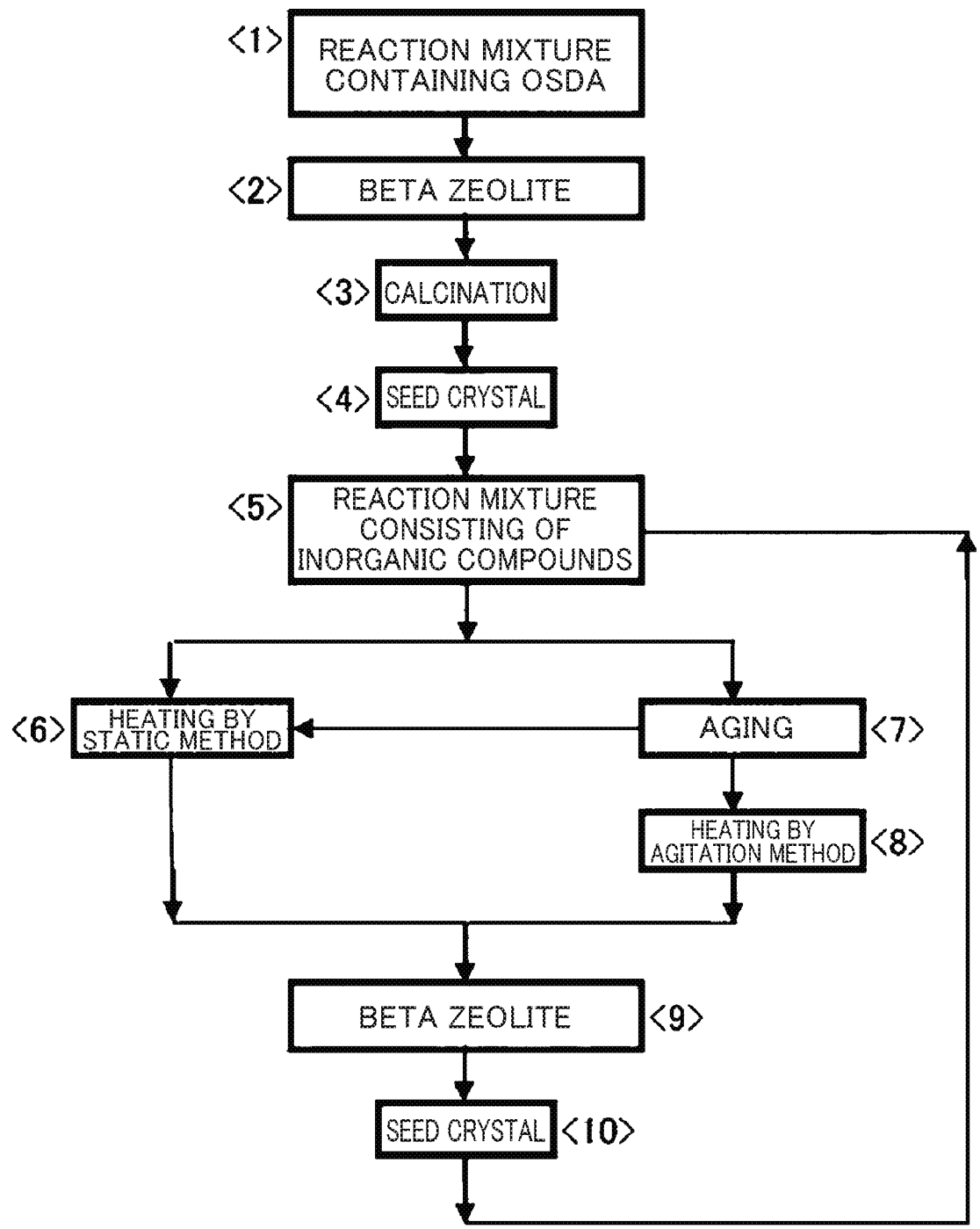
FIG. 1 is a flow chart of a method of synthesizing a beta zeolite.

'The beta zeolite is one synthesized using no organic structure-directing agent and comprises particles having a particle size of 10 μm or less in an amount of 90% or more on a volume basis in the particle size distribution as determined by a laser diffraction/scattering particle size distribution measuring method' includes, for example, those obtained by sorting out particles having a preferred particle size distribution from a beta zeolite obtained by a conventional production method without using an OSDA (<9> in FIG. 1). The beta zeolite of (I) is preferably a beta zeolite obtained from the beta zeolite produced without using an OSDA (<9> in FIG. 1), because such a method intrinsically eliminates use of an OSDA and repeated use results in ultimate reduction in environmental load and costs. For the reasons described above, the beta zeolite having the particle size distribution disclosed in (I) can withstand such repeated use. The "beta zeolite produced without using an OSDA" in this context, accordingly, may be a seed crystal produced in any one of the order of <4>, <5>, <6> and <9>; the order of <4>, <5>, <7>, <6> and <9>; the order of <4>, <5>, <7>, <8> and <9>; the order of <10>, <5>, <6> and <9>; the order of <10>, <5>, <7>, <6> and <9>; and the order of <10>, <5>, <7>, <8> and <9>. The "beta zeolite produced without using an OSDA" may or may not be a seed crystal produced via the steps (I) to (III). Since the seed crystal having undergone the steps (I) to (III) has high purity, repeated use is easy.

Methods for sorting out particles of preferred particle size distribution from the beta zeolite synthesized without using an OSDA (<9> in FIG. 1) include, for instance, the following methods. Namely, (A) a method of sorting out only crystal particles having a small particle size by adjusting the size of opening of filtration cloth used in filtration or (B) a method of sorting out by using a slurry in which crystals are dispersed and sorting out by sedimentation method is effective. Further, (C) sorting out by a wet method and (D) sorting out by a dry method are also possible.

The crystal particle size distribution of the beta zeolite obtained, without using an OSDA, by a conventional production method, which is <9> of FIG. 1, generally ranges over a wide range of from about 10 nm to 100 μm or more. If the peak of the crystal particle size distribution is shifted toward a small particle size side and majority of the particles exist in the small particle size side, crystal surface area increases and such a seed crystal effectively acts as a seed crystal. On the other hand, when the peak of the crystal particle size distribution is shifted toward the large particle size side and majority of the particles exist in the large particle size side, crystal surface area decreases and the effect as a seed crystal decreases. On the other hand, it is unnecessary to sort out the crystalline particles if the beta zeolite synthesized without using an OSDA remains the same as when the beta zeolite was synthesized; forms no aggregates; and has the particular particle size distribution described below.

From the above viewpoint, one of the aspects of the production method of the present invention is in that the beta zeolite seed crystal in (I) prior to the acid treatment includes 90% or more on a volume basis of particles having a particle size of 10 m or less in the particle size distribution by laser diffraction/scattering particle size distribution measuring method. Therefore, the beta zeolite of (I) has a volume accumulation particle size $D_{90}$ at accumulation volume of 90 vol % of 10 μm or less. In particular, the beta zeolite (I) above includes particles having a particle size of 10 μm or less preferably in an amount of 93% or more, more preferably, in an amount of 93.5% or more on a volume basis. Such particle-size distribution of the beta zeolite seed crystal enables successful obtainment of a seed crystal capable of producing a beta zeolite with high purity.

Another aspect of the production method of the present invention is in that the beta zeolite seed crystal is obtained by subjecting the beta zeolite having the particle size of (I) to the acid treatment of (II). As will be described below, when the beta zeolite having the particle size of (I) is used, the acid treatment achieves another effect that more efficient production of the beta zeolite can be achieved in a shorter time than when the acid treatment is not conducted.

The beta zeolite seed crystal after being subjected to the acid treatment also includes preferably 90% or more, more preferably 93% or more, and still more preferably 93.5% or more of particles having a particle size of 10 μm or less on a volume basis of the particle size distribution by laser diffraction/scattering particle size distribution measuring method. Although it has not been observed empirically by the present inventors that the particle size distribution changes by the acid treatment, dry coagulation is likely to occur in the subsequent washing and drying steps. Thus, it is preferable to measure the particle size distribution in a slurry state after the beta zeolite is synthesized or in a slurry state after sorting out or fractionation has been finished.

Incidentally, although the green beta is also formed in Patent Document 5 and Non-Patent Document 5 described above, the synthesis conditions of the green beta adopted in these documents differ from the production conditions of the present invention. These documents do not disclose use of beta zeolite particles which have been synthesized without using an OSDA and whose $D_{90}$ on a volume basis is 10 μm or less. With regard to the reason why the green beta was nevertheless formed in these documents where the conditions of the present invention are not employed, the inventors infer as follows: these documents adopt a high alkali concentration region as one of the synthesis conditions for the formation of green beta; the surface of seed crystals is dissolved in such a region during the crystallization, resulting in substantially smaller particle size of seed crystals.

For measurement of the particle size distribution of seed crystal by laser diffraction/scattering particle size distribution measuring method, for example, a nano particle size distribution analyzer of Shimadzu Corporation, SALD-7500 nano is used as a measuring device. When using this analyzer, the object to be measured is dispersed in water. The dispersion is a dilute liquid and it is possible for the analyzer to automatically judge whether or not a particular concentration is appropriate as the object to be measured. As pretreatment prior to measurements, an aqueous solution containing zeolites is sufficiently dispersed by agitation method or the like.

Next, the acid treatment of (II) will be further described. The present inventors have further intensively examined crystallization conditions, crystallinity, purity, pore characteristics and the like of beta zeolite when a seed crystal having the above-mentioned particle size distribution of (I) above is used as the beta zeolite seed crystal. In the course of the examination, it was surprisingly found that when a seed crystal which has the particle-size distribution of (I) is used as the beta zeolite seed crystal, use of the seed crystal subjected to contact treatment with an aqueous acidic solution (hereinafter, simply referred to as "acid treatment") enables the production of the beta zeolite in a short time. As described above, the production method of the present invention achieves shorter production time in addition to effective suppression of the formation of impurities.

The acid treatment of (II) is typically a treatment in which aluminum atoms are extracted from crystals of beta zeolite, so that the ratio $SiO_2/Al_2O_3$ of beta zeolite is usually higher after the acid treatment of (II) than before the acid treatment. In the present invention, the $SiO_2/Al_2O_3$ molar ratio of the beta zeolite seed crystal after the acid treatment is 150 or less. This accelerates crystallization speed and enables the production of a beta zeolite with high purity in the present invention. On the other hand, the $SiO_2/Al_2O_3$ molar ratio of beta zeolite seed crystal after acid treatment is preferably 12 or more from a viewpoint of easy shortening of the production time of beta zeolite. From these viewpoints, the $SiO_2/Al_2O_3$ molar ratio of the beta zeolite seed crystal after the acid treatment is more preferably 12 or more and 100 or less, and still more preferably 12 or more and 50 or less.

On the other hand, the $SiO_2/Al_2O_3$ molar ratio of the beta zeolite seed crystal before acid treatment is more preferably 8 or more and 15 or less, and still more preferably 10 or more and 13 or less, from a viewpoint of easy production of the beta zeolite before the acid treatment and easy obtainment of beta zeolite of desired characteristics after the acid treatment.

For example, too low $SiO_2/Al_2O_3$ ratio of beta zeolite seed crystal may make formation of beta zeolite be less easy to take place in some cases, depending on the $SiO_2/Al_2O_3$ ratio of reaction mixtures. Further, the $SiO_2/Al_2O_3$ ratio of an obtained beta zeolite tends to be lower than that of the beta zeolite seed crystal. For this reason, use of an increased $SiO_2/Al_2O_3$ ratio of beta zeolite seed crystal, which is achieved by acid treatment, enables beta zeolite to be easily obtained and it is also expected that repeated use of the seed crystal in the production of green beta zeolite will be further facilitated.

The molar ratio $Na_2O/Al_2O_3$ of the beta zeolite seed crystal after acid treatment is 0 or more and 1 or less, but the effect as a seed crystal is hardly affected regardless of the value of the molar ratio.

The acid used for the acid treatment may be an inorganic acid or an organic acid. Examples of the inorganic acid include hydrochloric acid, nitric acid, sulfuric acid and phosphoric acid. Examples of the organic acid include carboxylic acids such as citric acid, malic acid, lactic acid, oxalic acid, malonic acid, tartaric acid and succinic acid. These can be used alone or in combination of two or more. Inorganic acids, in particular, hydrochloric acid, nitric acid and sulfuric acid, are preferred from a viewpoint of excellent characteristics of obtained beta zeolite.

Specific methods of the acid treatment include, for example, (a) a method of dispersing or immersing beta zeolite having a specific particle size distribution of (I) in an acidic aqueous solution and (b) a method of flowing an acidic aqueous solution through a layer packed with beta zeolite having a specific particle size distribution of (I).

The concentration of acid in the acidic aqueous solution used for the acid treatment is preferably 0.05 N or more from a viewpoint of effectively obtaining a seed crystal which sufficiently exhibits the effect of the present invention, i.e., the shortened production time of beta zeolite. In addition, the concentration of acid in the acidic aqueous solution is preferably 2 N or less from a viewpoint of obtaining a seed crystal which enables the production of beta zeolite with high purity. From these viewpoints, the concentration of acid in the acidic aqueous solution is 0.07 N or more and 1.5 N or less.

The temperature of the acidic aqueous solution at the time of the acid treatment is preferably 25° C. or more from a viewpoint of efficiently obtaining a seed crystal which sufficiently achieves the effect of the present invention, i.e., the shortened production time of beta zeolite. In addition, the temperature of the acidic aqueous solution at the time of acid treatment is preferably 100° C. or less from a viewpoint of obtaining a seed crystal which enables the production of beta zeolite with high purity. From these viewpoints, the temperature of the acidic aqueous solution at the time of the acid treatment is preferably 30° C. or more and 80° C. or less.

The time for contacting beta zeolite with an acidic aqueous solution is preferably 0.1 hour or more from a viewpoint of easy obtainment of a seed crystal which sufficiently achieves the effect of the present invention, i.e., the shortened production time of beta zeolite. In addition, the time for contact treatment is preferably 10 hours or less from a viewpoint of obtainment of a beta zeolite with high purity. From these viewpoints, the time of contact treatment is preferably 0.1 hours or more and 5 hours or less. The beta zeolite seed crystal after acid treatment is preferably washed with water or the like.

In the present invention, seed crystal (1) (hereinafter also referred to as "seed crystal Z1"), which has a specific particle size distribution of (I) and has been subjected to acid treatment of (II), can be used in combination with a seed crystal other than the above as the seed crystal. Examples of seed crystal other than seed crystal (1) include seed crystal (2) (hereinafter also referred to as "seed crystal Z2") which is a beta zeolite synthesized without using an OSDA and having a specific particle size distribution of (I) but not having been subjected to acid treatment (II); and seed crystal (3) (hereinafter also referred to as "seed crystal Z3") which is a beta zeolite synthesized using an OSDA and calcined.

Seed crystal Z2 has already been studied by the inventors and was found to be effective in the synthesis of beta zeolite of <9>. However, too large ratio of seed crystal Z2 in the entire seed crystal may result in difficulty in obtaining the effect of shortened production time in some cases. From this viewpoint, the value of Z1/(Z1+Z2)×100 in the combination of seed crystal Z1 and seed crystal Z2 is preferably 30% by mass or more and 100% by mass or less, and more preferably 50% by mass or more and 100% by mass or less. In addition, seed crystal Z2 preferably consists of particles obtained by sorting particles having a specific particle size distribution out of beta zeolite (<9> in FIG. 1) (seed crystal (2)) from a viewpoint of improving an effect of simultaneously reducing environmental load and production costs.

The calcined seed crystal Z3 (seed crystal (3)) corresponds to <4> in FIG. 1. It is clear from Patent Document 4 and Non-Patent Documents 4 and 5 as well as the results of the discussions above by the present inventors that any seed crystal of <4> in FIG. 1 obtained by typical synthesis methods is effective in the synthesis of beta zeolite of <9>, regardless of the crystal particle size distribution. Therefore, a seed crystal containing seed crystal Z1 and calcined seed crystal Z3 can be used as a seed crystal to be added to the reaction mixture in the synthesis of the beta zeolite according to the present invention as well. The value of Z1/(Z1+Z3)×100, for instance, in the combination of seed crystal Z1 and seed crystal Z3 is preferably 30% by mass or more and 100% by mass or less, more preferably 50% by mass or more and 100% by mass or less, from a viewpoint of increasing the effect of simultaneously reducing environmental load and production costs.

An added amount of seed crystal (e.g., when Z2 and/or Z3 described above are used in addition to Z1, the total amount of Z1, Z2 and Z3) preferably ranges from 1% by mass to 30% by mass with respect to the mass of silica source contained in the reaction mixture, that is, the mass obtained by converting the mass of silicon contained in the reaction mixture to the mass of $SiO_2$. Although an added amount of seed crystal is preferably smaller in this range, the added amount of seed crystal is decided in consideration of reaction speed or the effect of suppressing impurities and the like. Form this viewpoint, the added amount of seed crystal is further preferably 1% by mass or more and 20% by mass or less relative to the mass of the silica source contained in the reaction mixture.

Seed crystal Z1 may be added to the reaction mixture in a solid state or in a solid-liquid mixture containing the seed crystal. The solid-liquid mixture refers to a slurry-like mixture in which seed crystals are dispersed in water. In this case, when seed crystal Z2 and/or seed crystal Z3 are used in addition to the above-mentioned seed crystal Z1 as the seed crystal, a solid-liquid mixture obtained by adding seed crystals Z2 and/or Z3 to seed crystal Z1 and mixing the resulting mixture can be used. As described above, since the seed crystal used in the present invention is in a state of fine particles, use of the seed crystal in a state of a solid may give rise to dust in some cases, which results in poor handling properties. In this regard, use of a seed crystal in the state of a solid-liquid mixture may easily eliminate such inconvenience. As a medium in the case of using the solid-liquid mixture, water containing no impurities is preferably used from viewpoints of high quality, safety and economy.

When seed crystals are used in the state of a solid-liquid mixture, for example, 1) a portion of the reaction mixture containing beta zeolite <9> in FIG. 1 is taken out at first. Subsequently, 2) coarse particles having a particle size of 10 μm or more are separated using a precipitation separation device such as a liquid cyclone, a filtration separation apparatus such as a vacuum filtration apparatus, or a centrifugal separator. Filtration using filtration cloth is also effective. After the separation of this 2), particles having a particle size of 10 μm or less are washed, followed by acid treatment and washing. Successively, 3) an excessive liquid phase is removed for concentration. Seed crystal Z1 of <10> exists in the solid-liquid mixture thus obtained. This is followed by 4) additional mixing of seed crystal Z2 and/or seed crystal Z3 into the solid-liquid mixture as required to obtain a final solid-liquid mixture as a seed crystal source. Incidentally, when such a solid-liquid mixture is used as a seed crystal source, the reaction mixture is desirably formed by quantitating the amounts of silica, alumina, alkali and water contained in the solid-liquid mixture and subtracting the amounts.

Mixing methods of seed crystals and a reaction mixture are not particularly limited. Any method by which seed crystals and a reaction mixture can be uniformly mixed can be adopted. Temperature and time are not particularly limited and mixing may be performed at room temperature.

The type of cations included in the seed crystal is not particularly limited and any cations that are inevitably included due to the procedures of the present invention may be contained.

As to the reaction mixture to be mixed with a seed crystal, a mixture obtained by mixing a silica source, an alumina source, an alkaline source and water so as to have compositions indicated by the following molar ratios is preferably used:

$SiO_2/Al_2O_3$=0 or more and less than 40, in particular 10 or more and 30 or less;
$Na_2O/SiO_2$=0.05 or more and 0.3 or less, in particular 0.1 or more and 0.3 or less; and
$H_2O/SiO_2$=5 or more and 50 or less, in particular 10 or more and 25 or less.

As the silica source used to obtain the reaction mixture having the above-mentioned molar ratios, silica per se and a silicon-containing compound that can generate a silicate ion in water can be used. To be specific, the silica source may include wet process silica, dry process silica, colloidal silica, sodium silicate and an aluminosilicate gel. These silica sources may be used independently or by combining two or more. Among these silica sources, it is preferable to use the silica (silicon dioxide) or the aluminosilicate gel in that the beta zeolite can be obtained without an unnecessary by-product.

As the alumina source, for instance, an aqueous aluminum containing-compound may be used. To be specific, the alumina source may include sodium aluminate, aluminum nitrate, aluminum sulfate and so on. Further, aluminum hydroxide or aluminosilicate gel is also one of the preferred alumina sources. These alumina sources may be used independently or by combining two or more. Among these alumina sources, it is preferable to use sodium aluminate or aluminosilicate gel in that the beta zeolite can be obtained without an unnecessary by-product (for instance, impurity zeolite or the like).

As the alkali source, for instance, sodium hydroxide may be used. When the sodium silicate is used as the silica source or when the sodium aluminate is used as the alumina source, the sodium that is an alkali metal component contained therein is simultaneously considered as NaOH and is also an alkaline component. Thus, $Na_2O$ described above is calculated as the sum of all the alkaline components in the reaction mixture.

For an addition sequence of the raw materials when the reaction mixture is prepared, any method that can easily achieve a uniform reaction mixture may be employed. For example, the alumina source is added to and dissolved in a sodium hydroxide aqueous solution under room temperature, and then the silica source is added and mixed by agitation. Thereby, the uniform reaction mixture can be obtained. The seed crystal can be added while being mixed with the silica source or after the silica source is added. Afterwards, the seed crystal is agitated and mixed to be uniformly dispersed. When the aluminosilicate gel is used as the alumina source, a typical method is one in which the aluminosilicate gel is added to water in which a seed crystal is dispersed to obtain a gel slurry and finally an aqueous sodium hydroxide solution is added, but the sequence of addition is not limited. A temperature when the reaction mixture is prepared is also not particularly limited as well and the reaction mixture may generally be prepared at room temperature (20 to 25° C.).

As described above, <10> in FIG. 1 is prepared as the seed crystal of beta zeolite, a green beta can be produced in any one of the order of <10>, <5>, <6> and <9>, the order of <10>, <5>, <7>, <6> and <9> and the order of <10>, <5>, <7>, <8> and <9>. Generally, a crystallization process is heated by a static method without agitation. Agitation can be conducted, for instance, throughout the time period during which the mixture of the seed crystal with the reaction mixture is heated.

When agitation is conducted in the crystallization process, heating is provided preferably after aging, because crystallization easily proceeds. The aging refers to a process of holding the reaction mixture at a lower temperature than a reaction temperature for a given time. As the effects of the aging, prevention of production of impurities as by-products, enablement of uniform heating during agitation without production of impurities as by-products, and increased reaction speed are known but the mechanism of action is not necessarily clear. The temperature and time of aging are set so that the afore-mentioned effects are maximized. In the present invention, heating can be performed in a range of from room temperature (20° C.) or more to 100° C. or less for 5 hours to 1 day.

Whichever of the static method and the agitation method is adopted, after the seed crystal and the reaction mixture are mixed with each other, heating can be provided at a temperature in a range of preferably 100° C. or more and 200° C. or less, more preferably 120° C. or more and 180° C. or less, under an autogenous pressure. Adopting a temperature of 100° C. or more enables crystallization speed to be sufficiently increased, and thereby it is possible to increase generation efficiency of the desired green beta. On the other hand, since adopting a temperature of 200° C. or less enables synthesis of the green beta without using an autoclave having high pressure resistance capacity, it is economically advantageous. Further, generation of impurities to an excessive degree is less easy to take place. The heating time is not critical in the present production method, and the heating may be performed until the beta zeolite having sufficiently high crystallinity is created. Generally, the beta zeolite having satisfactory crystallinity is obtained by heating of about 5 to 150 hours. In the present invention, using the seed crystal subjected to the acid treatment as described above enables the heating time to be shortened as compared with conventional heating time. The heating time in the above-mentioned temperature ranges typically requires more than 50 hours, but in the present production method, a beta zeolite with satisfactory crystallinity can be obtained with a heating time shorter than 50 hours. In the production method of the present invention, the heating time is preferably 50 hours or less, and more preferably 40 hours or less.

When the agitation method is employed, the agitation method and conditions are not particularly limited. Even when the static method is adopted, it is preferred to agitate the reaction mixture during the crystallization reaction, in order to ensure that the inner temperature in the temperature rising process is uniform. Further, in order to mix the seed crystal with the reaction mixture to a uniform state, to control the particle size of the desired green beta, or to decrease adhering amount to a reactor wall, it is also effective to agitate at a low speed or to perform intermittent agitation, during the crystallization reaction.

After completion of heating, powder of the created crystal is separated from a mother liquid by filtration, then washed with water or warm water and dried. Since the thus-obtained green beta does not contain an organic substance in a dried state, calcination is unnecessary. Once dehydrated, such a green beta can be used as an adsorbent or the like. Further, when the green beta is used as a solid acid catalyst, for instance, a $Na^+$ ion in the crystal is exchanged for a $NH_4^+$ ion, and then the crystal is calcined, and thereby the crystal can be used as an $H^+$ type.

The green beta obtained by the present production method can be suitably used, for instance, as an adsorption separating agent in various industrial fields or a catalyst in petrochemical industry, taking advantage of its large pore size and pore volume or solid acid characteristics. The $SiO_2/Al_2O_3$ molar ratio of the beta zeolite obtained by the present production method is preferred to be typically 8 or more and 20 or less from a viewpoint of use in the above-mentioned various applications.

The present invention includes "a beta zeolite produced by mixing a reaction mixture containing no organic compound and consisting of a silica source, an alumina source, an alkaline source and water, with a beta zeolite seed crystal and heating the resulting mixture, wherein the beta zeolite seed crystal is a beta zeolite synthesized without using an organic structure-directing agent and comprises particles having a particle size of 10 μm or less in an amount of 90% or more on a volume basis in the particle size distribution as determined by a laser diffraction/scattering particle size distribution measuring method, and the seed crystal has been subjected to contact treatment with an aqueous acidic solution, so that the $SiO_2/Al_2O_3$ molar ratio of the acid-treated zeolite is 150 or less. The present inventors confirmed that the beta zeolite produced by the above method can produce a beta zeolite with higher purity in shorter heating time than the beta zeolite produced using a seed crystal which does not satisfy the above requirements. Normally, any change in the structures or characteristics of the beta zeolite due to this treatment should be measured using some kind of means and should be explicitly specified in the claims of the present application. However, the structures or characteristics of the other beta zeolites associated with the effects of the present invention could not be confirmed with the Applicant's technical levels at least at the time of the present filing. In addition, even if all the factors could have been identified, the structures and characteristics of the beta zeolites associated with these factors would have needed to be identified by establishing new measuring methods. This had required considerably excessive economic expenditure and time. In view of the above circumstances, the Applicant discloses the beta zeolite of the present invention as being a product manufactured by the above-mentioned production method, as a preferred aspect of the beta zeolite of the present invention, from the consideration of speediness and the like required due to the nature of patent applications. As described above, at the time of the present filing, there was a circumstance that it was not possible to specify all the configurations and features of the beta zeolite produced by using a specific seed crystal.

EXAMPLES

Hereinafter, the present invention will be described in more detail by examples. However, the scope of the present invention is not limited to such examples. Analytical instruments used in the Examples and Comparative Examples below are as follows. Particle size distribution analyzer: Nano particle size distribution analyzer, SALD-7500 nano manufactured by Shimadzu Corporation, light source: semiconductor laser 405 nm
Powder X-ray diffractometer: Ultima IV manufactured by Rigaku Corporation, CuK α-ray used, voltage of 40 kV, current of 30 mA, scan step of 0.02° and scan speed of 2°/min
Composition analysis device: ICP-AES LIBERTY Series II manufactured by Varian Co. Ltd.

Reference Example 1

The aluminosilicate gel having a $SiO_2/Al_2O_3$ ratio=16.0 was prepared by using sodium silicate (No. 3), an aqueous solution of aluminum sulfate, sulfuric acid and purified water, according to methods disclosed in known patent publications (Japanese Examined Patent Application Publication No. S63-1244, Japanese Examined Patent Application Publication No. S63-46007, Japanese Examined Patent Application Publication No. H2-32204, Japanese Examined Patent Application Publication No. H2-44771, Japanese Examined Patent Application Publication No. H2-47403, Japanese Examined Patent Application Publication No. H3-45009, Japanese Examined Patent Application Publication No. H3-53251 and Japanese Unexamined Patent Application Publication No. H6-287015). The slurry of the synthesized aluminosilicate gel was filtered using a centrifuge, followed by washing with purified water to obtain a water-containing aluminosilicate gel. The water content was 68.5% by mass. This gel was stored in a sealed container without drying and was used in the Reference Examples, the Examples and the Comparative Examples below.

Reference Example 2

Figure 2:
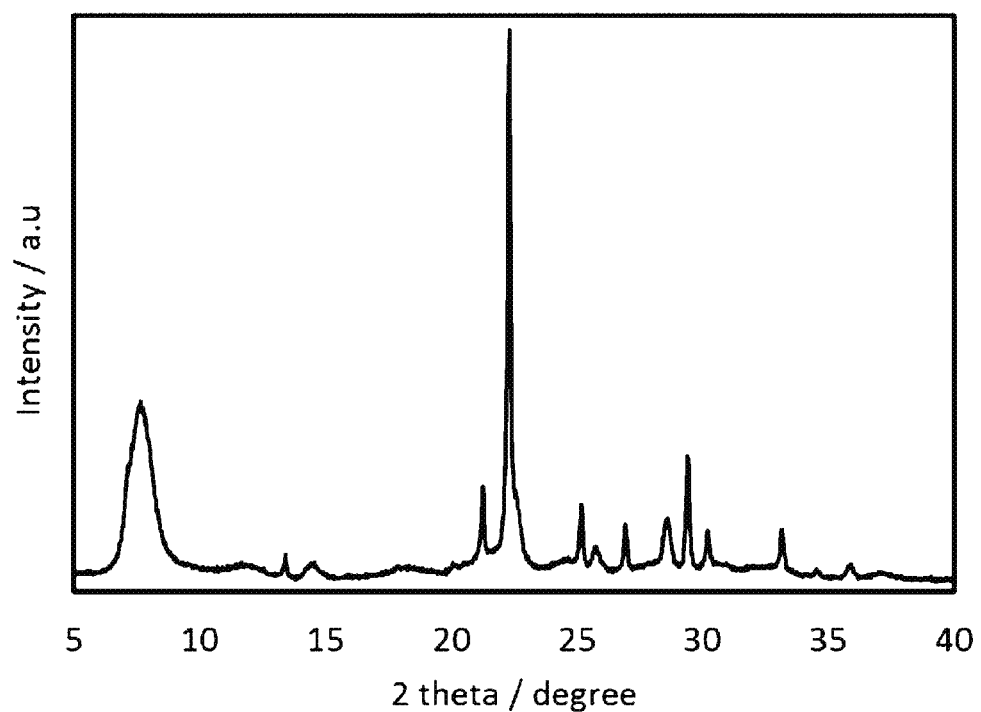
FIG. 2 is an X-ray diffraction diagram of entire crystals of a beta zeolite having a $SiO_2/Al_2O_3$ ratio=11.9 for the seed crystal synthesized in Reference Example 2.
Figure 3:
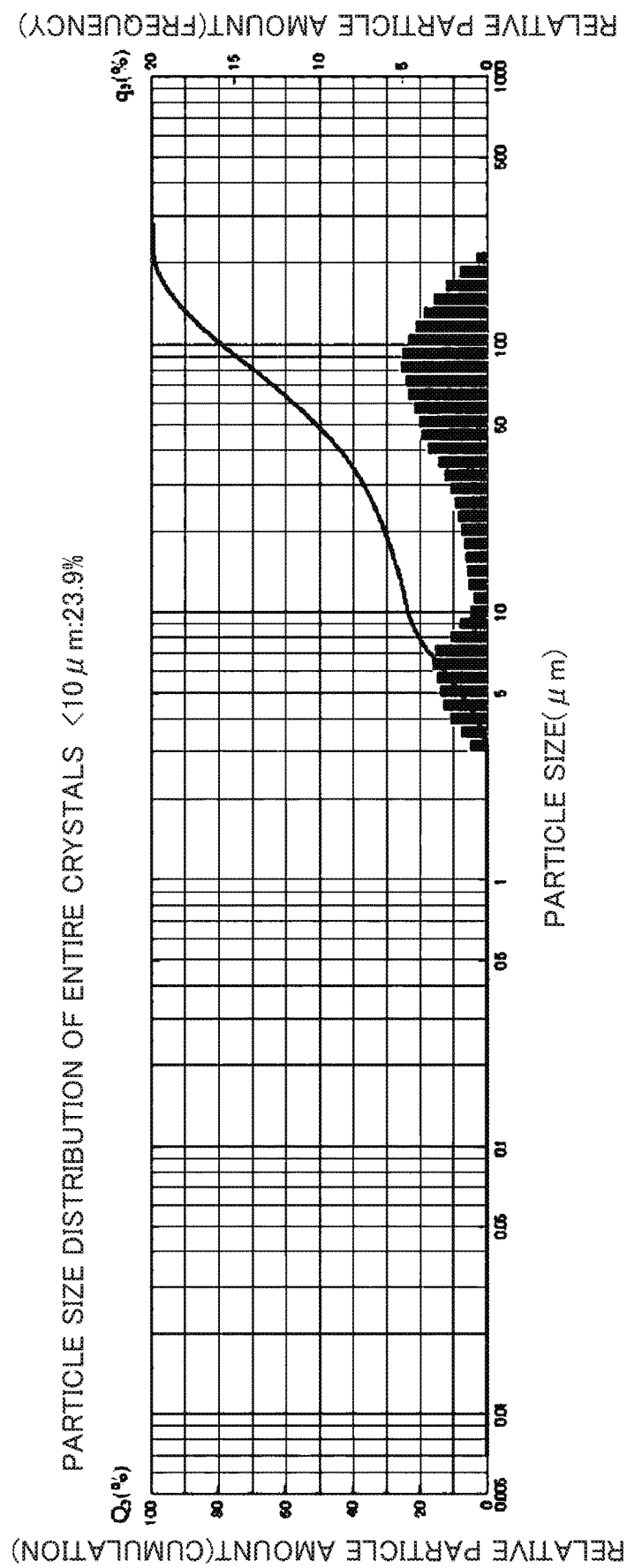
FIG. 3 is a particle size distribution chart of the entire crystals of a beta zeolite having a $SiO_2/Al_2O_3$ ratio=11.9 synthesized in Reference Example 2.

A reaction mixture having compositions of $SiO_2/Al_2O_3$ ratio=16.0, $Na_2O/SiO_2$=0.23 and $H_2O/SiO_2$=15 was prepared by using the aluminosilicate gel prepared in Reference Example 1, a 50 w/v % aqueous solution of sodium hydroxide and pure water. This reaction mixture was mixed with a seed crystal, and then heated at 150° C. for 43 hours to synthesize a beta zeolite without using any OSDA. The seed crystal used in this Reference Example was a beta zeolite of HSZ931HOA ($SiO_2/Al_2O_3$ ratio=31.8, calcined) manufactured by Tosoh Corporation. The total weight of the reaction mixture was 4.5 kg and an autoclave with a volume of 5 liter was used for the synthesis. After completion of the reaction, a portion of the generated slurry was filtered using No. 5C filter paper and washed with warm water at about 50° C. to collect all crystals in the portion of the slurry and dried at 80° C. (entire crystals). After it was confirmed by X-ray diffractometry that the product was a beta zeolite, the particle size distribution of the entire crystals in the generated slurry was measured. The ratio of particles having a particle size of 10 µm or less was 23.9% on a volume basis. The X-ray diffraction diagram and the particle size distribution chart of the entire crystals are indicated in FIGS. 2 and 3. The result of the composition analysis of entire crystals was as follows: $SiO_2/Al_2O_3$ ratio=11.9 and $Na_2O/SiO_2$=0.94.

Reference Example 3

Figure 4:
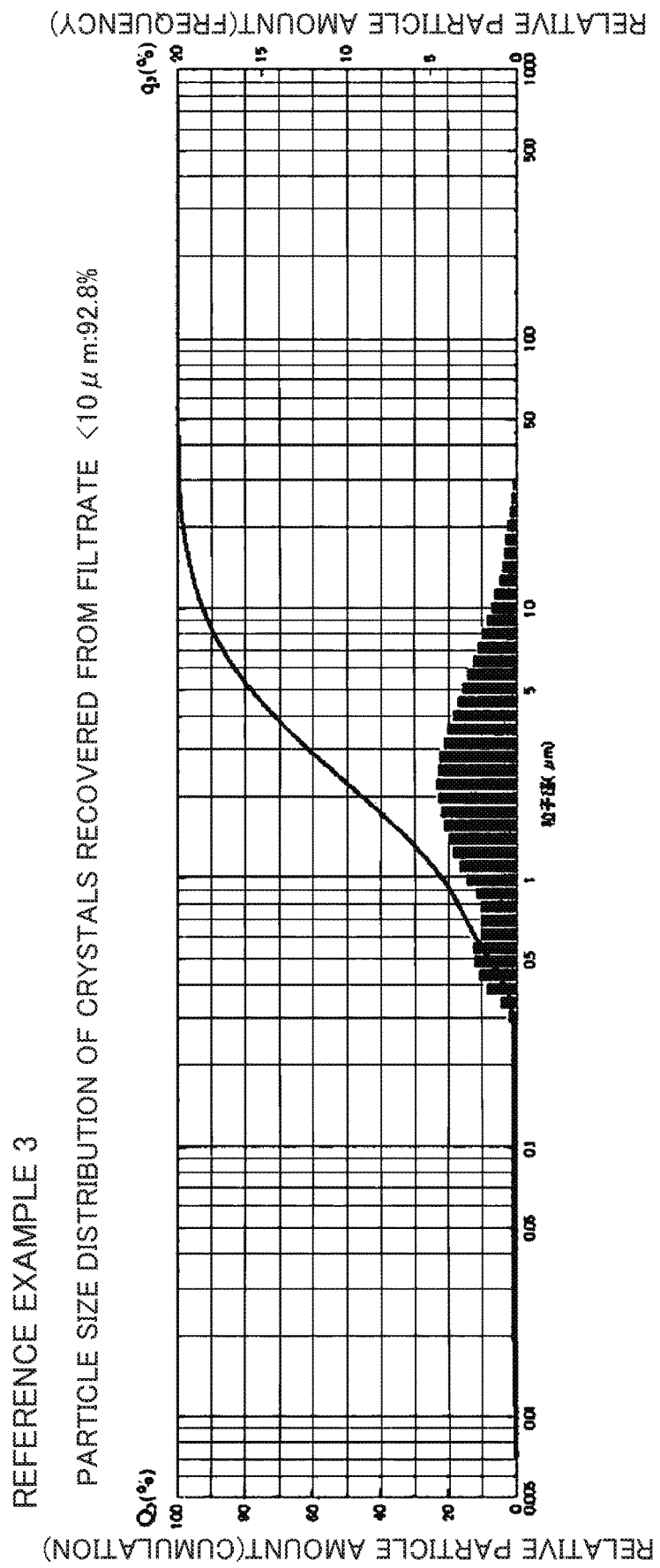
FIG. 4 is a particle size distribution chart of the crystals recovered from filtrate obtained in Reference Example 3.
Figure 5:
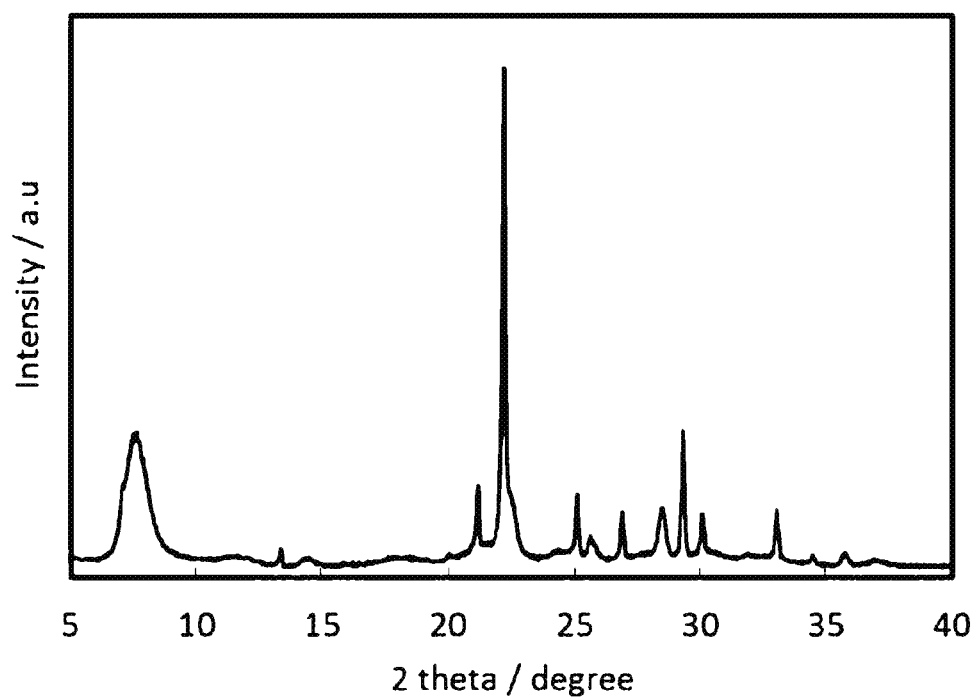
FIG. 5 is an X-ray diffraction diagram of the crystals recovered from filtrate synthesized in Reference Example 3.

The slurry containing entire crystals obtained in Reference Example 2 was centrifuged to separate a mother liquid and crystals. The slurry was washed with warm water at about 50° C. The opening of the filter cloth used at this time was 800 mesh. A slurry containing crystals that leaked from the filter cloth during separation of the crystals from the mother liquid and during washing of the crystals was collected and the particle size distribution of the crystals (crystals obtained by filtration) was measured. The ratio of particles having a particle size of 10 µm or less was 92.8%. The particle size distribution chart is shown in FIG. 4. The slurry containing the crystals that leaked from the filter cloth was filtered using No. 5C filter paper and washed with warm water at about 50° C. to collect all crystals and dried at 80° C. (crystals recovered from filtrate). The X-ray diffraction diagram of the crystal recovered from filtrate is shown in FIG. 5. The result of the composition analysis of the crystals recovered from filtrate was as follows: $SiO_2/Al_2O_3$ ratio=11.8 and $Na_2O/SiO_2$=0.92.

Reference Example 4

Figure 6:
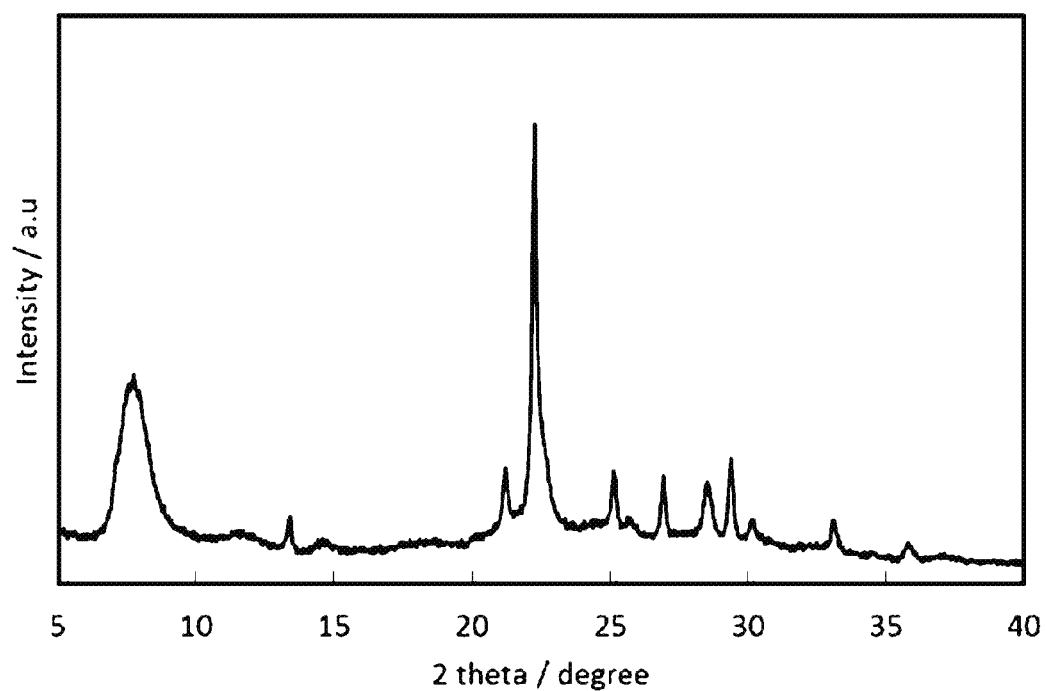
FIG. 6 is an X-ray diffraction diagram of acid-treated crystals synthesized in Reference Example 4.

Eight grams of the crystals recovered from filtrate in Reference Example 3 were dispersed in 200 ml of an aqueous 0.15 N hydrochloric acid solution in a plastic container and then heated at 60° C. for 2 hours while the container was sealed and stirred in a water bath. Thereafter, the crystals were filtered and washed with purified water to obtain acid-treated crystals. The X-ray diffraction diagram of this crystal is shown in FIG. 6. The results of the composition analysis of the crystals were $SiO_2/Al_2O_3$ ratio=13.8 and $Na_2O/SiO_2$=0.09. The results are shown in Table 1.

Reference Examples 5 to 8

For each of the Reference Examples 5 to 8, 8 g of the crystals recovered from filtrate in Reference Example 3 was subjected to acid treatment in the same manner as in Reference Example 4 to obtain acid-treated crystals, except that an aqueous hydrochloric acid solution of a different concentration was used. The results of the respective composition analyses are shown in Table 1.

Reference Examples 9 to 13

Figure 7:
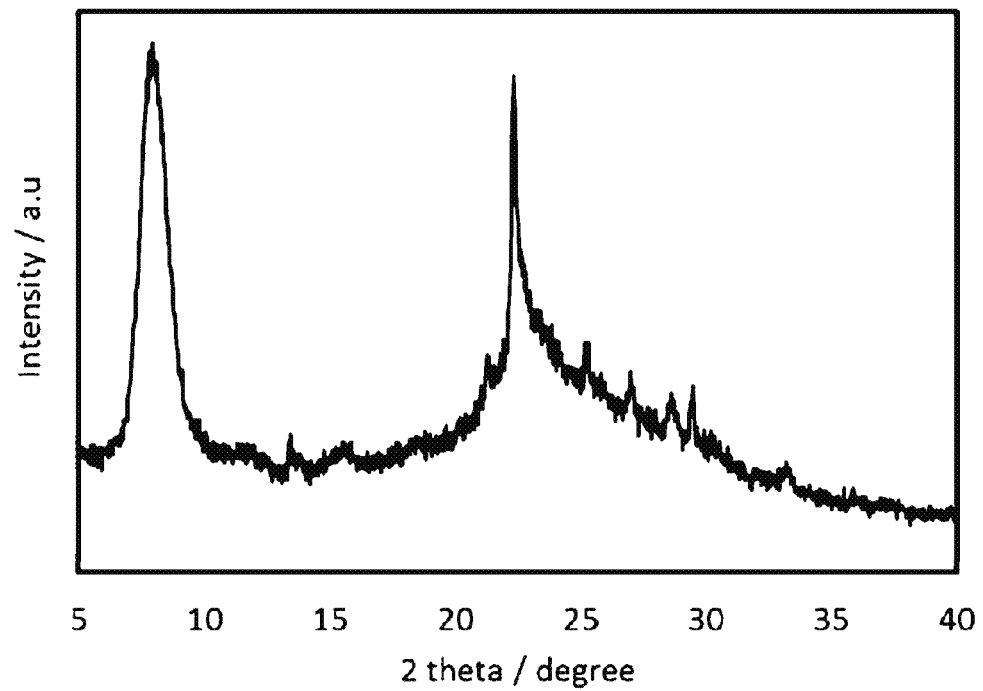
FIG. 7 is an X-ray diffraction diagram of acid-treated crystals synthesized in Reference Example 12.

For each of the Reference Examples 9 to 13, 8 g of the crystals recovered from filtrate in Reference Example 3 was subjected to acid treatment in the same manner as in Reference Example 4 to obtain acid-treated crystals, except that an aqueous sulfuric acid solution of a different concentration was used. The X-ray diffraction diagram of the crystal of Reference Example 12 is shown in FIG. 7. The results of the respective composition analyses are shown in Table 1.

Reference Examples 14 to 17

Figure 8:
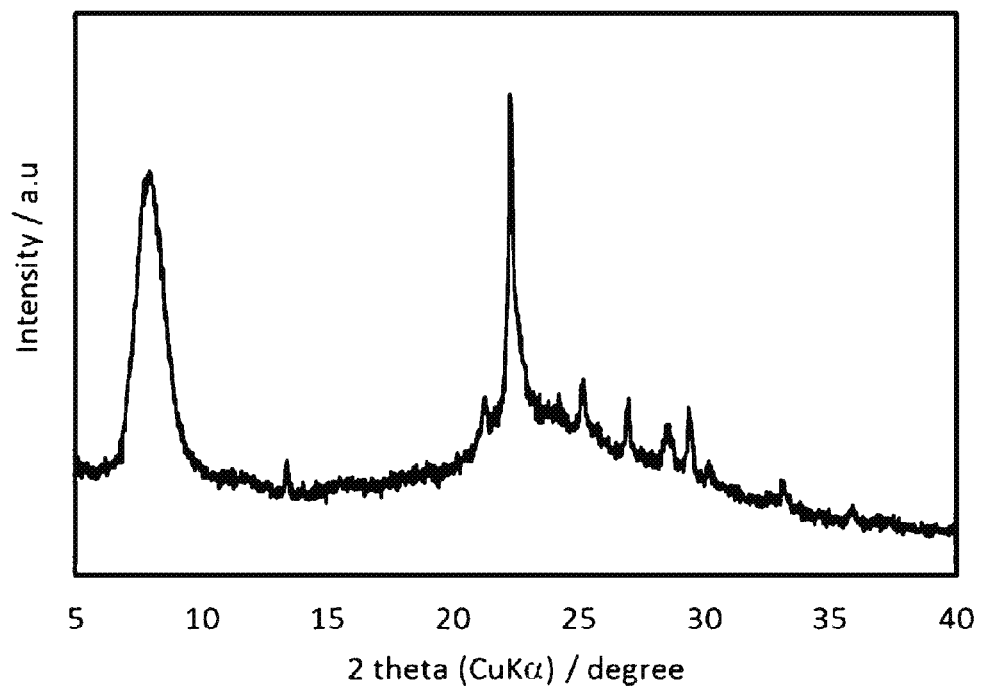
FIG. 8 is an X-ray diffraction diagram of acid-treated crystals synthesized in Reference Example 16.

For each of the Reference Examples 14 to 17, 8 g of the crystals recovered from filtrate in Reference Example 3 was subjected to acid treatment in the same manner as in Reference Example 4 to obtain acid-treated crystals, except that an aqueous nitric acid solution of a different concentration was used. The X-ray diffraction diagram of the crystal of Reference Example 16 is shown in FIG. 8. The results of the respective composition analyses are shown in Table 1.

Reference Examples 18 to 20

For each of the Reference Examples 18 to 20, 8 g of the entire crystals obtained in Reference Example 2 (ratio of particles having a particle size of 10 μm or less: 23.9%) was subjected to acid treatment in the same manner as in Reference Example 4 to obtain acid-treated crystals, except that aqueous hydrochloric acid, sulfuric acid and nitric acid solutions of different concentrations were respectively used. The results of the respective composition analyses are shown in Table 1.

Reference Example 21

Eight grams of the crystals recovered from filtrate in Reference Example 3 was subjected to acid treatment in the same manner as in Reference Example 4 to obtain acid-treated crystals, except that an aqueous 0.6 N hydrochloric acid solution was used. The result of the composition analysis is shown in Table 1.

TABLE 1

| Reference Example | Acid/concentration (N) | Composition after acid treatment (Molar ratio) | |
|---|---|---|---|
| | | $SiO_2/Al_2O_3$ | $Na_2O/Al_2O_3$ |
| 3 | No acid treatment | 11.8 | 0.92 |
| 4 | Hydrochloric acid/0.15 | 13.8 | 0.09 |
| 5 | Hydrochloric acid/0.2 | 18.0 | 0.14 |
| 6 | Hydrochloric acid/0.25 | 22.8 | 0.08 |
| 7 | Hydrochloric acid/0.3 | 38.8 | 0.13 |
| 8 | Hydrochloric acid/0.4 | 91.8 | 0.14 |
| 9 | Sulfuric acid/0.15 | 15.6 | 0.11 |
| 10 | Sulfuric acid/0.2 | 19.6 | 0.12 |
| 11 | Sulfuric acid/0.25 | 25.2 | 0.11 |
| 12 | Sulfuric acid/0.3 | 44.0 | 0.12 |
| 13 | Sulfuric acid/0.4 | 95.0 | 0.11 |
| 14 | Nitric acid/0.15 | 16.2 | 0.11 |
| 15 | Nitric acid/0.2 | 19.8 | 0.12 |
| 16 | Nitric acid/0.25 | 25.8 | 0.11 |
| 17 | Nitric acid/0.3 | 45.6 | 0.12 |
| 18 | Hydrochloric acid/0.2 | 18.3 | 0.15 |
| 19 | Sulfuric acid/0.3 | 43.2 | 0.10 |
| 20 | Nitric acid/0.25 | 26.2 | 0.13 |
| 21 | Hydrochloric acid/0.6 | 171 | 0.01 |

Example 1

Figure 9:
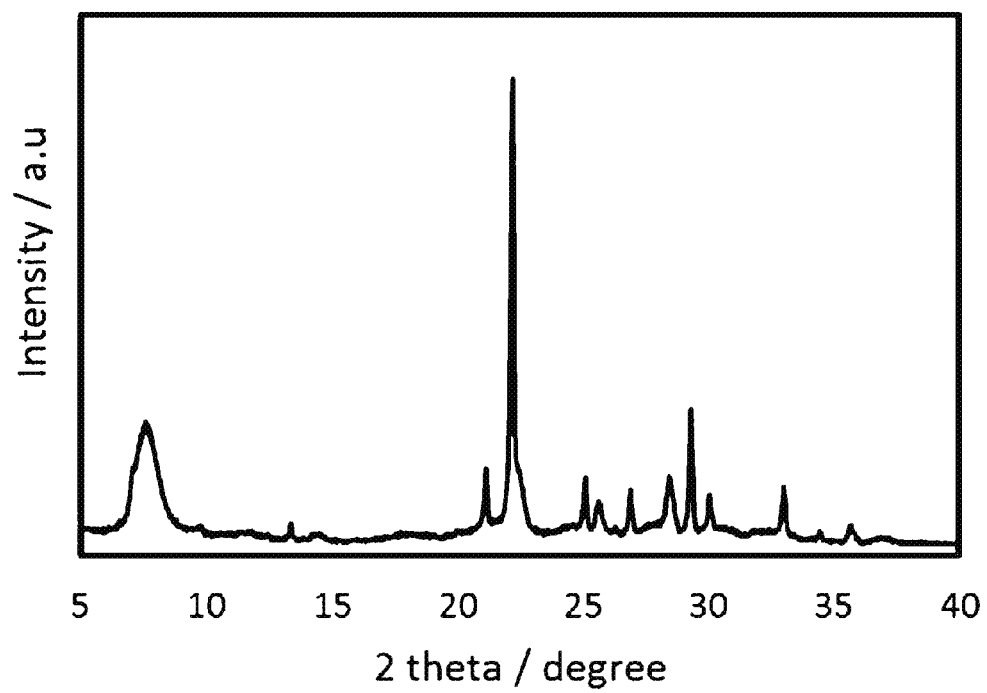
FIG. 9 is an X-ray diffraction diagram of a product synthesized in Example 1.

The aluminosilicate gel having a $SiO_2/Al_2O_3$ ratio=16.0 obtained in Reference Example 1, purified water and a 50 w/v % aqueous solution of sodium hydroxide were mixed to prepare a reaction mixture having compositions shown in Table 2. Then, the acid-treated seed crystal obtained in Reference 4 was added and stirred uniformly. The added amount of the acid-treated seed crystal was 10 wt % relative to the silica component in the aluminosilicate gel. This reaction mixture was sealed in a pressurizing container made of stainless-steel with a volume of 60 ml, and the container was placed in a dryer and heated at 150° C. for 43 hours. After the product was filtered, washed and dried, the product was measured by the X-ray diffractometer. The product contained a beta zeolite alone, as shown in FIG. 9. The $SiO_2/Al_2O_3$ ratio was as shown in Table 2.

In order to show that the crystallization time in Table 2 was the shortest time required for the production of the beta zeolite with high purity, the heating time at 150° C. was shortened as described in Table 2. The result of the measurement by the X-ray diffractometer is shown in Table 2. In Table 2, "beta zeolite+amorphous substance" indicates that a mixture containing the beta zeolite, as a main component, and an amorphous substance was detected in the X-ray diffractometry measurement. In this case, a broad peak due to the amorphous substance was detected. On the other hand, a mere recitation "beta zeolite" indicates that a beta zeolite alone was detected in the X-ray diffractometry measurement. The product of the crystallization process changes over time from "amorphous substance" (single amorphous substance)→"amorphous substance+beta zeolite" (mixture of an amorphous substance as a main component and a beta zeolite)→"beta zeolite+amorphous substance"→"beta zeolite". The results shown in Table 2 indicate that the crystallization time of 43 hours was approximately the shortest time in Example 1 to obtain the beta zeolite without forming an amorphous substance.

Examples 2 to 5

The beta zeolites were synthesized in the same manner as in Example 1, except that the respective hydrochloric acid-treated seed crystals obtained in Reference Examples 5 to 8 were used as the seed crystal. The crystallization conditions, the products and the $SiO_2/Al_2O_3$ ratios thereof were as shown in Table 2 and the beta zeolites were produced in high purity without production of impurities as by-products. In order to show that the respective crystallization times in Table 2 were the shortest times required for the production of the beta zeolites with high purity, the respective heating times at 150° C. were shortened as described in Table 2. The results of the measurements by the X-ray diffractometer are shown in Table 2.

Examples 6 to 10

Figure 10:
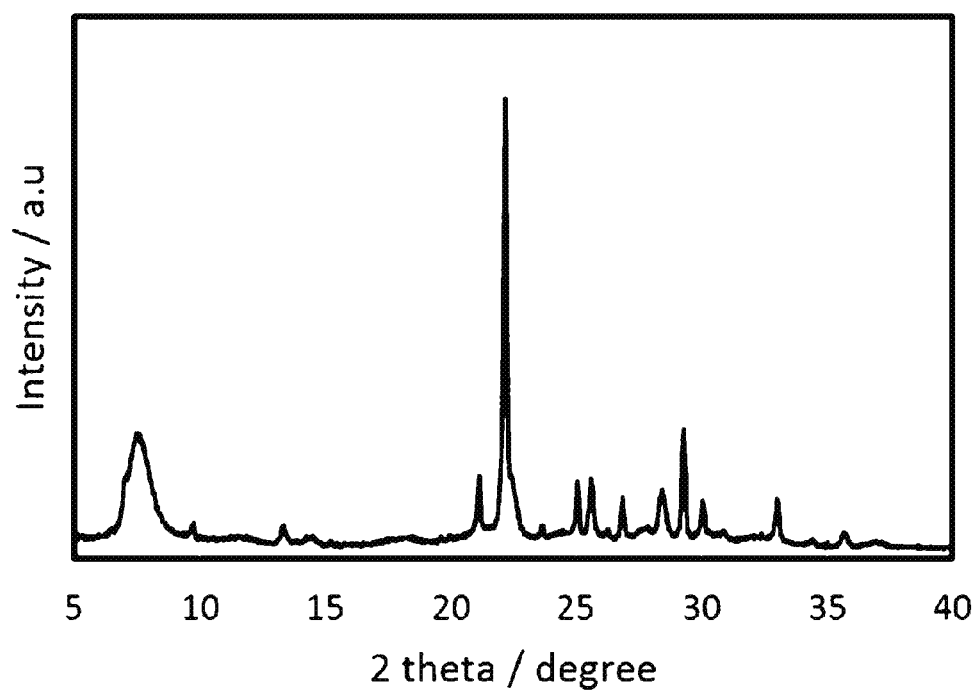
FIG. 10 is an X-ray diffraction diagram of a product synthesized in Example 9.

The beta zeolites were synthesized in the same manner as in Example 1, except that the respective sulfuric acid-treated seed crystals obtained in Reference Examples 9 to 13 were used as the seed crystal. The crystallization conditions, the products and the $SiO_2/Al_2O_3$ ratios thereof were as shown in Table 2 and the beta zeolites were produced in high purity without production of impurities as by-products. The X-ray diffraction diagram of the beta zeolite obtained in Example 9 is shown in FIG. 10. In order to show that the respective crystallization times in Table 2 were the shortest times required for the production of the beta zeolites with high purity, the heating times at 150° C. were shortened as described in Table 2. The results of the measurements by the X-ray diffractometer are shown in Table 2 as well.

Examples 11 to 14

The beta zeolites were synthesized in the same manner as in Example 1, except that the respective nitric acid-treated seed crystals obtained in Reference Examples 14 to 17 were used as the seed crystal. The crystallization conditions and the products and the $SiO_2/Al_2O_3$ ratios thereof were as shown in Table 2 and the beta zeolites were produced in high purity without production of impurities as by-products. In order to show that the crystallization times in Table 2 were the shortest times required for the production of the beta zeolites with high purity, the heating times at 150° C. were shortened as described in Table 2. The results of the measurements by the X-ray diffractometer are shown in Table 2 as well.

Examples 15 to 20

Figure 11:
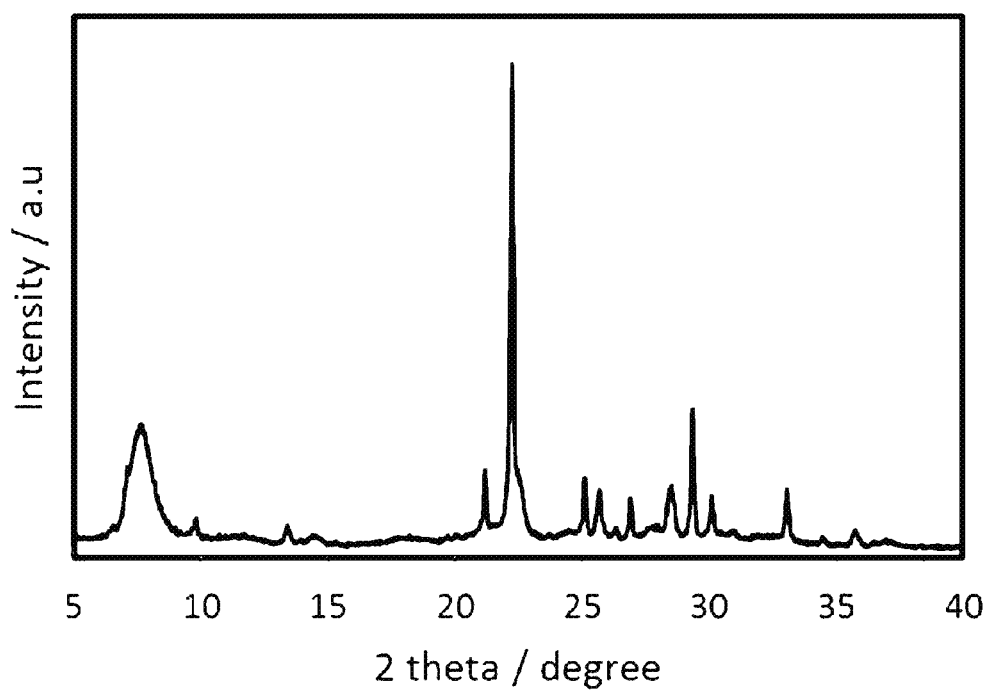
FIG. 11 is an X-ray diffraction diagram of a product synthesized in Example 17.
Figure 12:
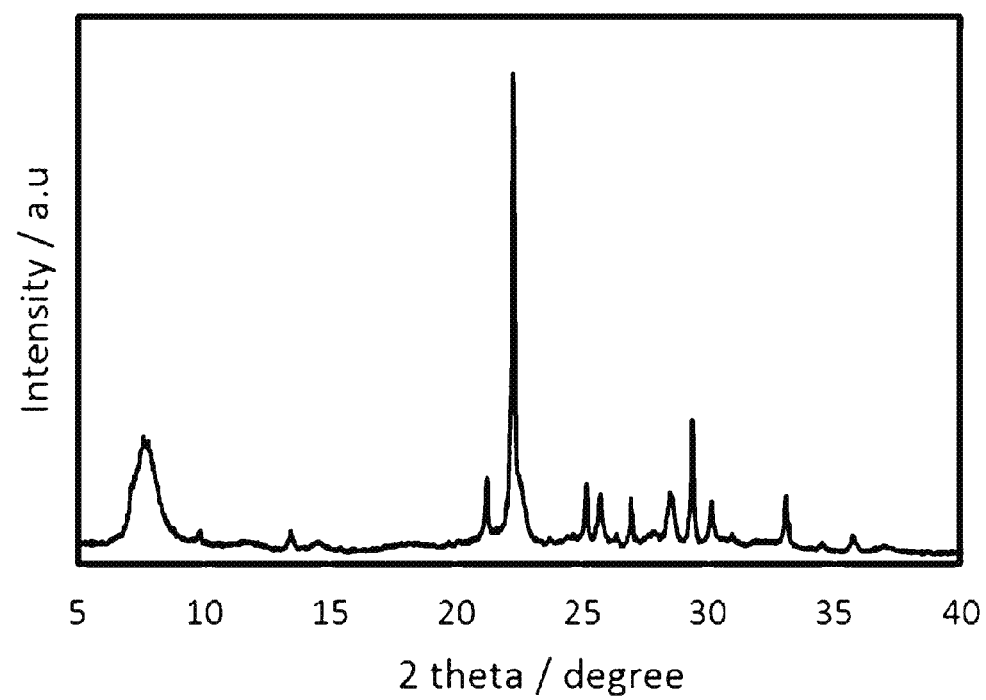
FIG. 12 is an X-ray diffraction diagram of a product synthesized in Example 19.

As the seed crystal, the acid-treated seed crystal (obtained in Reference Examples 10 or 12) and the crystal recovered from filtrate without being subjected to the acid treatment (Reference Example 3, ratio of particles having a particle size of 10 μm or less: 92.8%) were used in combination or the acid-treated seed crystal and the beta zeolite of HSZ931HOA ($SiO_2/Al_2O_3$ ratio=31.8, calcined) manufactured by Tosoh Corporation were used in combination. Except for these points, the beta zeolites were synthesized in the same manner as in Example 1. The mixing ratio of various seed crystals, the crystallization conditions and the products as well as the $SiO_2/Al_2O_3$ ratios were as shown in Table 3. The beta zeolites were produced in high purity without production of impurities as by-products. The X-ray diffraction diagrams of the beta zeolites obtained in Examples 17 and 19 are shown in FIGS. 11 and 12, respectively. In order to show that the respective production times of the present Examples were the shortest times required for the production of beta zeolites with high purity, the crystallization times were shortened as described in Table 3 in the present Examples. The results of the measurements by the X-ray diffractometer are also shown in Table 3.

Comparative Example 1

The aluminosilicate gel having a $SiO_2/Al_2O_3$ ratio=16.0 obtained in Reference Example 1, purified water and a 50 w/v % aqueous solution of sodium hydroxide were mixed to prepare a reaction mixture having compositions described in Table 4.

Further, the entire crystals of the beta zeolite obtained in Reference Example 2 without being subjected to the acid treatment (the ratio of particles having a particle size of 10 μm or less: 23.9%) was added and stirred uniformly. The added amount of the seed crystal was 10 wt % relative to the silica component of the aluminosilicate gel. This reaction mixture was placed into a pressurizing container made of stainless steel with a volume of 60 ml and sealed, and the container was placed statically in a dryer and heated at 150° C. for 43 hours. After the product was filtered, washed and dried, the product was measured using the X-ray diffractometry. The product was a mixture of mordenite and a beta zeolite and a mordenite-based zeolite.

Comparative Examples 2 to 5

The beta zeolites were synthesized in the same manner as in Comparative Example 1, except that the acid-treated seed crystals obtained in Reference Examples 18 to 21 were used. The crystallization conditions and the products were shown in Table 2. As shown in Table 2, the products were a mixture of mordenite and a beta zeolite, or only mordenite and no beta zeolite with high purity was obtained.

TABLE 2

| | Composition of reaction mixture (Molar ratio) | | | Seed crystal | | Crystallization conditions | | Product | | Product with shorter production time |
|---|---|---|---|---|---|---|---|---|---|---|
| Example | $SiO_2/Al_2O_3$ | $Na_2O/SiO_2$ | $H_2O/SiO_2$ | Type (Reference Example No.) | Added amount (wt %) | Temperature (° C.) | Time (h) | Zeolite | $SiO_2/Al_2O_3$ (Molar ratio) | (Production time) thereof |
| 1 | 16 | 0.23 | 15 | 4 | 10 | 150 | 43 | Beta zeolite | 10.8 | Beta zeolite + Amorphous substance (39 h) |
| 2 | 16 | 0.23 | 15 | 5 | 10 | 150 | 37 | Beta zeolite | 11.4 | Beta zeolite + Amorphous substance (34 h) |
| 3 | 16 | 0.23 | 15 | 6 | 10 | 150 | 37 | Beta zeolite | 11.8 | Beta zeolite + Amorphous substance (33 h) |
| 4 | 16 | 0.23 | 15 | 7 | 10 | 150 | 40 | Beta zeolite | 11.2 | Beta zeolite + Amorphous substance (36 h) |
| 5 | 16 | 0.23 | 15 | 8 | 10 | 150 | 45 | Beta zeolite | 11.0 | Beta zeolite + Amorphous substance (40 h) |
| 6 | 16 | 0.23 | 15 | 9 | 10 | 150 | 40 | Beta zeolite | 11.0 | Beta zeolite + Amorphous substance (37 h) |
| 7 | 16 | 0.23 | 15 | 10 | 10 | 150 | 35 | Beta zeolite | 10.8 | Beta zeolite + Amorphous substance (32 h) |
| 8 | 16 | 0.23 | 15 | 11 | 10 | 150 | 35 | Beta zeolite | 11.4 | Beta zeolite + Amorphous substance (32 h) |
| 9 | 16 | 0.23 | 15 | 12 | 10 | 150 | 37 | Beta zeolite | 11.0 | Beta zeolite + Amorphous substance (34 h) |
| 10 | 16 | 0.23 | 15 | 13 | 10 | 150 | 40 | Beta zeolite | 11.6 | Beta zeolite + Amorphous substance (37 h) |

TABLE 2-continued

| Example | Composition of reaction mixture (Molar ratio) | | | Seed crystal | | Crystallization conditions | | Product | | Product with shorter production time |
| | $SiO_2/Al_2O_3$ | $Na_2O/SiO_2$ | $H_2O/SiO_2$ | Type (Reference Example No.) | Added amount (wt %) | Temperature (°C.) | Time (h) | Zeolite | $SiO_2/Al_2O_3$ (Molar ratio) | (Production time thereof) |
|---|---|---|---|---|---|---|---|---|---|---|
| 11 | 16 | 0.23 | 15 | 14 | 10 | 150 | 40 | Beta zeolite | 10.8 | Beta zeolite + Amorphous substance (37 h) |
| 12 | 16 | 0.23 | 15 | 15 | 10 | 150 | 38 | Beta zeolite | 10.8 | Beta zeolite + Amorphous substance (35 h) |
| 13 | 16 | 0.23 | 15 | 16 | 10 | 150 | 39 | Beta zeolite | 11.2 | Beta zeolite + Amorphous substance (36 h) |
| 14 | 16 | 0.23 | 15 | 17 | 10 | 150 | 40 | Beta zeolite | 11.4 | Beta zeolite + Amorphous substance (36 h) |

TABLE 3

| Example | Composition of reaction mixture (Molar ratio) | | | Seed crystal | | Crystallization conditions | | Product | | Product with shorter production time |
| | $SiO_2/Al_2O_3$ | $Na_2O/SiO_2$ | $H_2O/SiO_2$ | Type (Reference Example No.) | Added amount (wt %) | Temperature (°C.) | Time (h) | Zeolite | $SiO_2/Al_2O_3$ (Molar ratio) | (Production time thereof) |
|---|---|---|---|---|---|---|---|---|---|---|
| 15 | 16 | 0.23 | 15 | 3<br>10 | 5<br>5 | 150 | 45 | Beta zeolite | 10.6 | Beta zeolite + Amorphous substance (40 h) |
| 16 | 16 | 0.23 | 15 | 10<br>HSZ931HOA | 5<br>5 | 150 | 45 | Beta zeolite | 11.0 | Beta zeolite + Amorphous substance (40 h) |
| 17 | 16 | 0.23 | 15 | 3<br>12 | 5<br>5 | 150 | 45 | Beta zeolite | 11.6 | Beta zeolite + Amorphous substance (42 h) |
| 18 | 16 | 0.23 | 15 | 3<br>12 | 2.5<br>7.5 | 150 | 40 | Beta zeolite | 11.4 | Beta zeolite + Amorphous substance (37 h) |
| 19 | 16 | 0.23 | 15 | 12<br>HSZ931HOA | 5<br>5 | 150 | 45 | Beta zeolite | 11.2 | Beta zeolite + Amorphous substance (40 h) |
| 20 | 16 | 0.23 | 15 | 12<br>HSZ931HOA | 7.5<br>2.5 | 150 | 40 | Beta zeolite | 10.8 | Beta zeolite + Amorphous substance (36 h) |

TABLE 4

| Comparative Example | Composition of reaction mixture (Molar ratio) | | | Seed crystal | | Crystallization conditions | | Product |
| | $SiO_2/Al_2O_3$ | $Na_2O/SiO_2$ | $H_2O/SiO_2$ | Type (Reference Example No.) | Added amount (wt %) | Temperature (°C.) | Time (h) | Zeolite |
|---|---|---|---|---|---|---|---|---|
| 1 | 16 | 0.23 | 15 | 2 | 10 | 150 | 45 | Mordenite + Beta |
| 2 | 16 | 0.23 | 15 | 18 | 10 | 150 | 45 | Mordenite + Beta |
| 3 | 16 | 0.23 | 15 | 19 | 10 | 150 | 45 | Mordenite + Beta |
| 4 | 16 | 0.23 | 15 | 20 | 10 | 150 | 45 | Mordenite + Beta |
| 5 | 16 | 0.23 | 15 | 21 | 10 | 150 | 45 | Mordenite |

As described above, it can be seen that the beta zeolites with high purity could be produced in Example 1 to 20 without production of impurities as by-products. On the other hand, in all of Comparative Example 1 where the seed crystal which neither had the specific particle size distribution nor was acid-treated was used, Comparative Examples 2 to 4 where the seed crystals were acid-treated but did not have the specific particle size distribution and Comparative Examples 5 where the seed crystal was acid-treated and had the specific particle size distribution but had a $SiO_2/Al_2O_3$ ratio greater than 150, the products contained mordenite as the main phase, only a small amount of beta zeolite compared to mordenite and no beta zeolite with high purity. In Examples 1 to 20, the production time was less than 50 hours and the beta zeolite could be produced in short time.

The invention claimed is:

1. A method of producing a beta zeolite comprising: mixing an organic compound-free reaction mixture containing a silica source, an alumina source, an alkaline source and water with a beta zeolite seed crystal and heating the resulting mixture, wherein
   (I) a beta zeolite which is synthesized without using an organic structure-directing agent and comprises particles having a particle size of 10 μm or less in an amount of 90% or more on a volume basis in the particle size distribution as determined by a laser diffraction/scattering particle size distribution measuring method,
   (II) the beta zeolite is subjected to contact treatment with an aqueous acidic solution, and thereby
   (III) an acid-treated zeolite having a $SiO_2/Al_2O_3$ molar ratio of 150 or less is prepared and this is used as the beta zeolite seed crystal.

2. The method of producing a beta zeolite according to claim 1, wherein (1) and (2) below are used in combination as the beta zeolite seed crystal:
   (1) the acid-treated zeolite and
   (2) the beta zeolite which is synthesized without using an organic structure-directing agent, comprises particles having a particle size of 10 μm or less in an amount of 90% or more on a volume basis in the particle size distribution and is not subjected to contact treatment with an acidic aqueous solution.

3. The method of producing a beta zeolite according to claim 1, wherein (1) and (3) below are used in combination as the beta zeolite seed crystal:
   (1) the acid treated zeolite and
   (3) a calcined crystal of the beta zeolite synthesized using an organic structure-directing agent.

4. The method of producing a beta zeolite according to claim 1, wherein the reaction mixture has molar ratios described below:
   $SiO_2/Al_2O_3$=8 or more and less than 40,
   $Na_2O/SiO_2$=0.05 or more and 0.3 or less and
   $H_2O/SiO_2$=5 or more and 50 or less.

5. The method of producing a beta zeolite according to claim 1, wherein the $SiO_2/Al_2O_3$ molar ratio of the acid-treated zeolite is 100 or less.

6. The method of producing a beta zeolite according to claim 1, comprising preparing a solid-liquid mixture containing (i) below as the beta zeolite seed crystal and adding the solid-liquid mixture to the reaction mixture, wherein
   (i) is a beta zeolite which is synthesized without using an organic structure-directing agent, comprises particles having a particle size of 10 μm or less in an amount of 90% or more on a volume basis in the particle size distribution and is subjected to contact with an acidic aqueous solution.

7. The method of producing a beta zeolite according to claim 6, comprising using a solid-liquid mixture obtained by mixing (i) above and (ii) below as the beta zeolite seed crystal and adding the solid-liquid mixture to the reaction mixture, wherein
   (ii) is a beta zeolite which is synthesized without using an organic structure-directing agent, comprises particles having a particle size of 10 μm or less in an amount of 90% or more on a volume basis in the particle size distribution and is not subjected to contact with an acidic aqueous solution.

8. The method of producing a beta zeolite according to claim 6, comprising using a solid-liquid mixture obtained by mixing (i) above with (iii) below as the beta zeolite seed crystal and adding the solid-liquid mixture to the reaction mixture, wherein
   (iii) is a calcined crystal of beta zeolite synthesized using an organic structure-directing agent.

9. The method of producing a beta zeolite according to claim 1, wherein particles of the beta zeolite which is synthesized without using an organic structure-directing agent are sorting out by (A) a method of sorting out only crystal particles having a small particle size by adjusting a size of opening of filtration cloth used in filtration, (B) a method of sorting out by using a slurry in which crystals are dispersed and sorting out by sedimentation method, (C) a wet method, or (D) a dry method, prior to being subjected to the contact treatment.

* * * * *